(12) United States Patent
Lovitt et al.

(10) Patent No.: US 9,244,583 B2
(45) Date of Patent: Jan. 26, 2016

(54) ADJUSTING USER INTERFACE SCREEN ORDER AND COMPOSITION

(75) Inventors: Andrew William Lovitt, Redmond, WA (US); Michael Hall, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 783 days.

(21) Appl. No.: 13/316,211

(22) Filed: Dec. 9, 2011

(65) Prior Publication Data

US 2013/0151983 A1 Jun. 13, 2013

(51) Int. Cl.
 G06F 3/048 (2013.01)
 G06F 3/0481 (2013.01)
 G06F 9/44 (2006.01)

(52) U.S. Cl.
 CPC ............ *G06F 3/0481* (2013.01); *G06F 9/4443* (2013.01); *G06F 2203/04803* (2013.01)

(58) Field of Classification Search
 CPC ..................................................... G06F 3/0481
 USPC ................... 715/745, 732, 778, 789
 See application file for complete search history.

(56) References Cited

U.S. PATENT DOCUMENTS

| | | | |
|---|---|---|---|
| 5,235,679 A | 8/1993 | Yoshizawa et al. | |
| 5,600,776 A | 2/1997 | Johnson et al. | |
| 5,666,502 A | 9/1997 | Capps | |
| 5,852,440 A | 12/1998 | Grossman et al. | |
| 6,448,986 B1 | 9/2002 | Smith | |
| 6,564,170 B2 | 5/2003 | Halabieh | |
| 6,577,323 B1 | 6/2003 | Jamieson et al. | |
| 6,603,490 B1 * | 8/2003 | Coombs ........................ 715/783 |
| 6,668,177 B2 | 12/2003 | Salmimaa et al. | |
| 6,757,001 B2 | 6/2004 | Allport | |
| 6,956,560 B2 | 10/2005 | Brothers et al. | |
| 7,051,289 B1 | 5/2006 | Yoshida | |

(Continued)

FOREIGN PATENT DOCUMENTS

| CN | 1886973 | 12/2006 |
|---|---|---|
| CN | 102067078 | 5/2011 |

(Continued)

OTHER PUBLICATIONS

"Blackboard Release 9—What's NEW?", Retrieved on: Sep. 29, 2011, Available at: http://www.cod.edu/it/blackboard/bb9_new/CourseMenu.htm.

(Continued)

*Primary Examiner* — Namitha Pillai
(74) *Attorney, Agent, or Firm* — John Jardine; Leonard Smith; Micky Minhas (57) ABSTRACT

The present invention extends to methods, systems, and computer program products for user interface screen order and composition. Embodiments of the invention include using historical data and/or contextual data to augment, rearrange, or reconfigure menus and/or screen flows and add/remove/hide/expose content and functionality for users. Screen flow adjustments are formulated based on historical data and/or contextual data. The formulated adjustments facilitate more appropriate access to specified user interface elements within a screen flow in view of identified user interface elements of interest. The screen flow is adjusted in accordance with the formulated adjustments to facilitate more appropriate access to the specified user interface elements.

20 Claims, 7 Drawing Sheets

(56) References Cited

U.S. PATENT DOCUMENTS

| | | |
|---|---|---|
| 7,370,276 B2 | 5/2008 | Willis |
| 7,386,279 B2 | 6/2008 | Wagner et al. |
| 7,487,000 B1 | 2/2009 | Chevalier et al. |
| 7,590,947 B1 | 9/2009 | Gay et al. |
| 7,620,894 B1 | 11/2009 | Kahn |
| 7,865,841 B2 * | 1/2011 | Morikawa ............... 715/811 |
| 8,065,628 B2 | 11/2011 | Oshiro et al. |
| 8,161,417 B1 | 4/2012 | Lee |
| 2002/0010723 A1 | 1/2002 | Nielsen |
| 2002/0118223 A1 | 8/2002 | Steichen et al. |
| 2003/0151627 A1 | 8/2003 | Meserth et al. |
| 2003/0222922 A1 | 12/2003 | Rummel |
| 2004/0090470 A1 | 5/2004 | Kim et al. |
| 2005/0054381 A1 | 3/2005 | Lee et al. |
| 2006/0101122 A1 | 5/2006 | Ishii |
| 2007/0067269 A1 | 3/2007 | Rudge et al. |
| 2007/0190504 A1 | 8/2007 | Schwartz et al. |
| 2008/0005700 A1 * | 1/2008 | Morikawa ............... 715/841 |
| 2008/0306886 A1 | 12/2008 | Otto et al. |
| 2009/0172562 A1 | 7/2009 | Lai |
| 2009/0319462 A1 | 12/2009 | Tirpak et al. |
| 2010/0003951 A1 | 1/2010 | Ray et al. |
| 2010/0058224 A1 | 3/2010 | Chai et al. |
| 2010/0260327 A1 | 10/2010 | Ray |
| 2011/0131506 A1 | 6/2011 | Calissendorff |
| 2011/0164042 A1 | 7/2011 | Chaudhri |
| 2011/0185321 A1 | 7/2011 | Capela et al. |
| 2011/0193939 A1 | 8/2011 | Vassigh et al. |
| 2011/0202493 A1 | 8/2011 | Li |
| 2013/0152001 A1 | 6/2013 | Lovitt et al. |

FOREIGN PATENT DOCUMENTS

| | | |
|---|---|---|
| EP | 1843568 | 10/2007 |
| KR | 10-2009-0110202 | 10/2009 |
| WO | WO 0196994 | 12/2001 |

OTHER PUBLICATIONS

Boudreaux, Toby, "Touch Patterns: Chapter 6—Programming the iPhone User Experience", Available at least as early as Sep. 29, 2011, Available at <<http:/ oreill.com/iphone/excerpts/iphone-programming-user/touch-patterns.html>>.

Li, et al., "Interaction-based Rendering Optimization in Sketch-based User Interfaces", Available at least as early as Jun. 2003, Available at <<http://citeseerx.ist.psu.edu/viewdoc/download?doi=10.1.1.110.9507&rep=rep1&type=pdf>>.

Haarslev, et al., "Visualization and Graphical Layout in Object-Oriented Systems", In Journal of Visual Languages and Computing, vol. 3, Issue 1, Mar. 1992, pp. 1-23.

Office Action dated Oct. 10, 2012 cited in U.S. Appl. No. 13/316,101.

Notice of Allowance dated Apr. 2, 2013 cited in U.S. Appl. No. 13/316,101.

Office Action dated Sep. 17, 2013 cited in U.S. Appl. No. 13/316,101.

Office Action dated Nov. 22, 2013 cited in U.S. Appl. No. 13/316,101.

Office Action dated Sep. 6, 2014 cited in U.S. Appl. No. 13/316,101.

Supplementary European Search Report Issued in Patent Application No. 12855333.6, Mailed Date: Jun. 1, 2015, 9 Pages.

* cited by examiner

ADJUSTING USER INTERFACE SCREEN ORDER AND COMPOSITION

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

On many computers devices, such as, for example, mobile, automotive, embedded systems, the user interface system includes a myriad of menus and screens containing context specific buttons and animations. However, a user may only need or desire to use a subset of the screens and menus for their interactions with the device. These interactions can be a combination of user specific, context specific, device specific, or manufacturer specific.

However, the desired subset of screens and menus may only be accessible by traversing a number of other screens and menu options. Thus, the user is required to traverse the other screens and menu options any time they want to access the desired subset of screens and menus. This is inefficient and can be frustrating for a user.

BRIEF SUMMARY

The present invention extends to methods, systems, and computer program products adjusting user interface screen order and composition. Usage information related to a user interface is accessed. The usage information describes one or more user's interactions with user interface elements in a screen flow of interconnected user interface screens. Each user interface screen includes at least one user interface element.

One or more user interface elements of interest are identified from within the screen flow based on the accessed usage information. Adjustments to the screen flow are formulated. The formulated adjustments facilitate more appropriate access to specified user interface elements within the screen flow in view of the identified one or more user interface elements of interest. The screen flow is adjusted in accordance with the formulated adjustments for more appropriate access to the specified user interface elements.

In some embodiments, either alternately or in combination, contextual information is used when formulating screen flow adjustments. Contextual information can represent an operating context for an application. One or more user interface elements of interest that are to be adjusted are identified from within a screen flow based on the operating context. Adjustments to the screen flow are formulated to more appropriately present the screen flow in view of the operating context. The screen flow is adjusted in accordance with the formulated adjustments to more appropriately access user interface elements on a display device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for adjusting user interface screen order and composition. Usage information related to a user interface is accessed. The usage information describes one or more user's interactions with user interface elements in a screen flow of interconnected user interface screens. Each user interface screen includes at least one user interface element.

One or more user interface elements of interest are identified from within the screen flow based on the accessed usage information. Adjustments to the screen flow are formulated. The formulated adjustments facilitate more appropriate access to specified user interface elements within the screen flow in view of the identified one or more user interface elements of interest. The screen flow is adjusted in accordance with the formulated adjustments for more appropriate access to the specified user interface elements.

In some embodiments, either alternately or in combination, contextual information is used when formulating screen flow adjustments. Contextual information can represent an operating context for an application. Based on the operating context, one or more user interface elements of interest that are to be adjusted are identified from within a screen flow. Adjustments to the screen flow are formulated to more appropriately present the screen flow in view of the operating context. The screen flow is adjusted in accordance with the formulated adjustments to more appropriately access user interface elements on a display device.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and the following claims, a "screen flow" is defined as the screens accessible to a device. A screen flow can have new screens or windows pop up when a button is selected, an option is taken, or a system initiates a change.

Embodiments of the invention adjust user interface screen order and composition to facilitate more appropriate access to menu options. User interactions with a device can be learned and used as data to determine how to adjust the order and composition of user interface screens on a display device. Multiple aspects of user interactions, including context aware (or unaware), historical user interactions, per using settings, device settings, OEM settings, group usage, etc., can be considered when adjusting user interface screen order and composition.

Adjustments to user interface screen order and composition can include augmenting, rearranging, and reconfiguring menus and/or screen flow. Historically relevant objects or new options and elements in a menu or graphical system can be collected and displayed. Menus and screens can be reordered to bring predominate options to a more visible placement (whether on a home screen, new screen, reordering screens, new widgets, etc.). These new flows and options then provide a more efficient way for the user to access options they are more likely to use. Menus and screens can also be added or removed from a screen flow.

Figure 1:
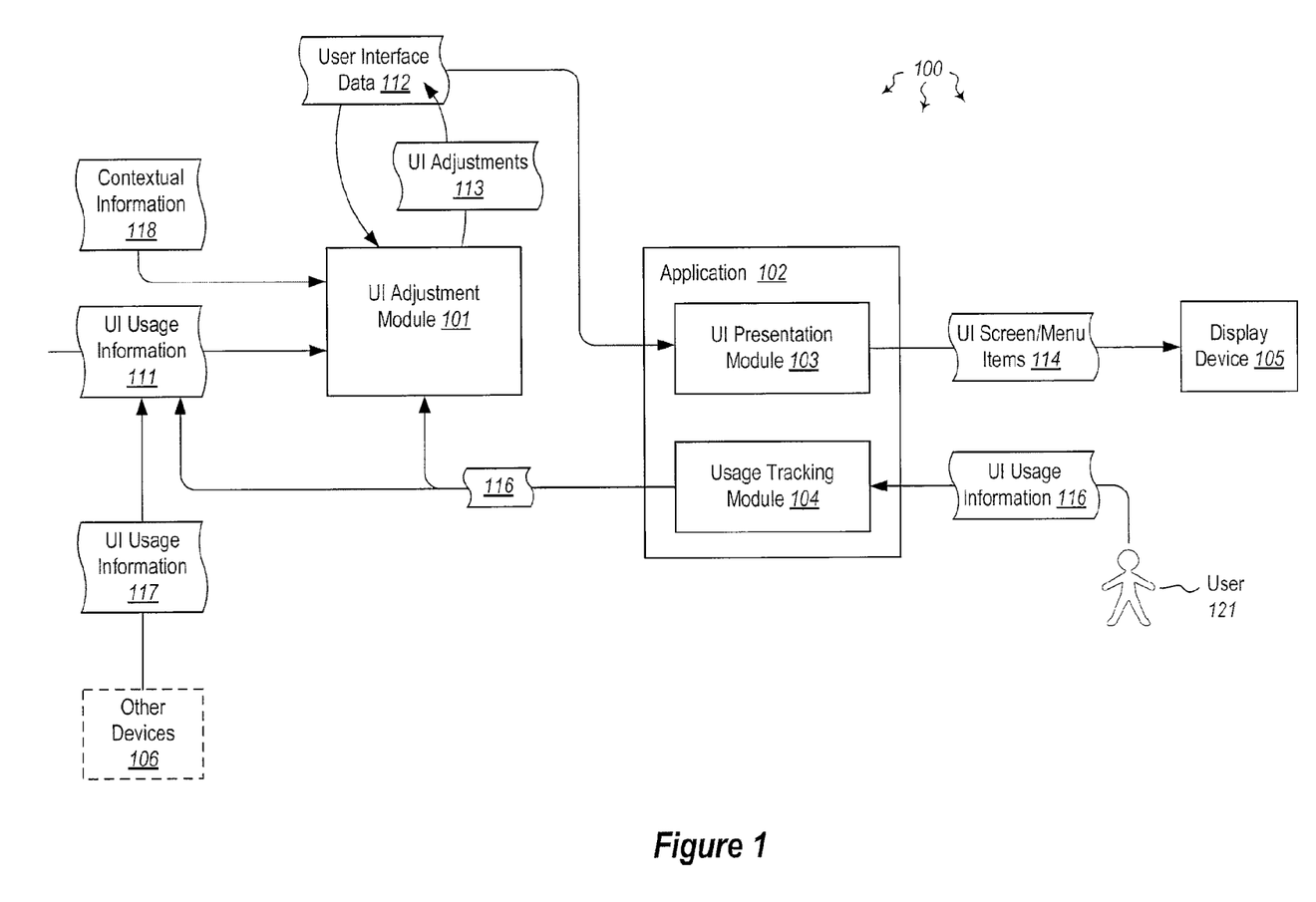
FIG. 1 illustrates an example computer architecture that facilitates adjusting a screen flow.

FIG. 1 illustrates an example computer architecture 100 that facilitates adjusting a screen flow. Referring to FIG. 1, computer architecture 100 includes UI adjustment module 101, application 102, display device 105, and other devices 106. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In general, UI adjustment module 101 is configured to modify user interface data for an application. User interface data can be modified based on one or more of prior, current, and expected user interaction with an application. For example, UI adjustment module 101 can access UI usage information collected for one or more users of an application at a corresponding one or more devices. UI adjustment module 101 can formulate UI adjustments for the application's user interface based on the UI usage information. UI adjustment module 101 can modify user interface data for the application in accordance with the UI adjustments.

Alternately or in combination, user interface data can be modified based on contextual information (e.g., device/manufacturer settings, user preferences, operating environment, weather, time, date, etc.). For example, UI adjustment module 101 can access contextual information for an application. UI adjustment module 101 can formulate UI adjustments for the application's user interface based on the contextual information. UI adjustment module 101 can modify user interface data for the application in accordance with the UI adjustments.

As depicted, application 102 includes UI presentation module 103 and usage tracking module 104. Generally, UI presentation module 103 accesses user interface data for application 102 and sends corresponding UI screens (containing UI elements) to a display device for presentation. As a user interacts with application 102, usage tracking module 104 collects UI usage information for application 102. The tracked UI usage information can be stored and/or combined with UI usage information collected for other users and/or at other devices using application 102.

Display device 105 is configured to receive and present UI screens for user interfaces. Display device 105 may also receive user input, such as, for example, when display device 105 includes touch screen functionality. Alternately or in combination, input is received through other physical input devices, such as, for example, knobs, dials, push buttons, key boards, mice, etc. For example, inside a vehicle or at a mobile device, user interface controls (either physical or touch screen) can be used to select menu options of moving between UI screens.

Physical and virtual controls can be linked. For example, a device may have a physical button and a touch screen play for moving to a next menu. The physical button and the touch screen button can both impact user data storage in the same way. Thus, if a user presses the physical button, the virtual button on the screen is activated as if the virtual button had been selected.

The described functionality for user interfaces at specified devices are merely examples, the described functionality can also be implemented at a variety of other devices. Further, the user interface functionality for a specified device and/or application can overlap with other devices and/or applications. Thus, different devices can run applications and interact with user interfaces for the applications using one or more of: different screen flows, different user interface screens, and different menu options (either physical or touch screen).

For example, it may be that application 102, a similar application, or even a dissimilar application is run on various devices in other devices 106. Devices 106 can include modules similar to UI presentation module 103 and usage tracking module 104. As such, UI usage information for application 102, the similar application, or the dissimilar application can also be collected at other devices 106. In some embodiments, usage information from a plurality of devices is considered when adjusting user interface screen order and composition.

Accordingly, in some embodiments, user interface screen order and composition at one application is adjusted based on usage information for a user interface at another application (either at the same device or a different device). For example, user interface screen order and composition for an entertainment system in a car can be adjusted based on usage information from a home entertainment control center at a desktop computer system.

Further, in some embodiments, historical data is collected and combined from a separate device using a possibly different flow. For example, if a user doesn't use checkins on their phone check in functionality can be removed from their car infotainment system.

Figure 2:
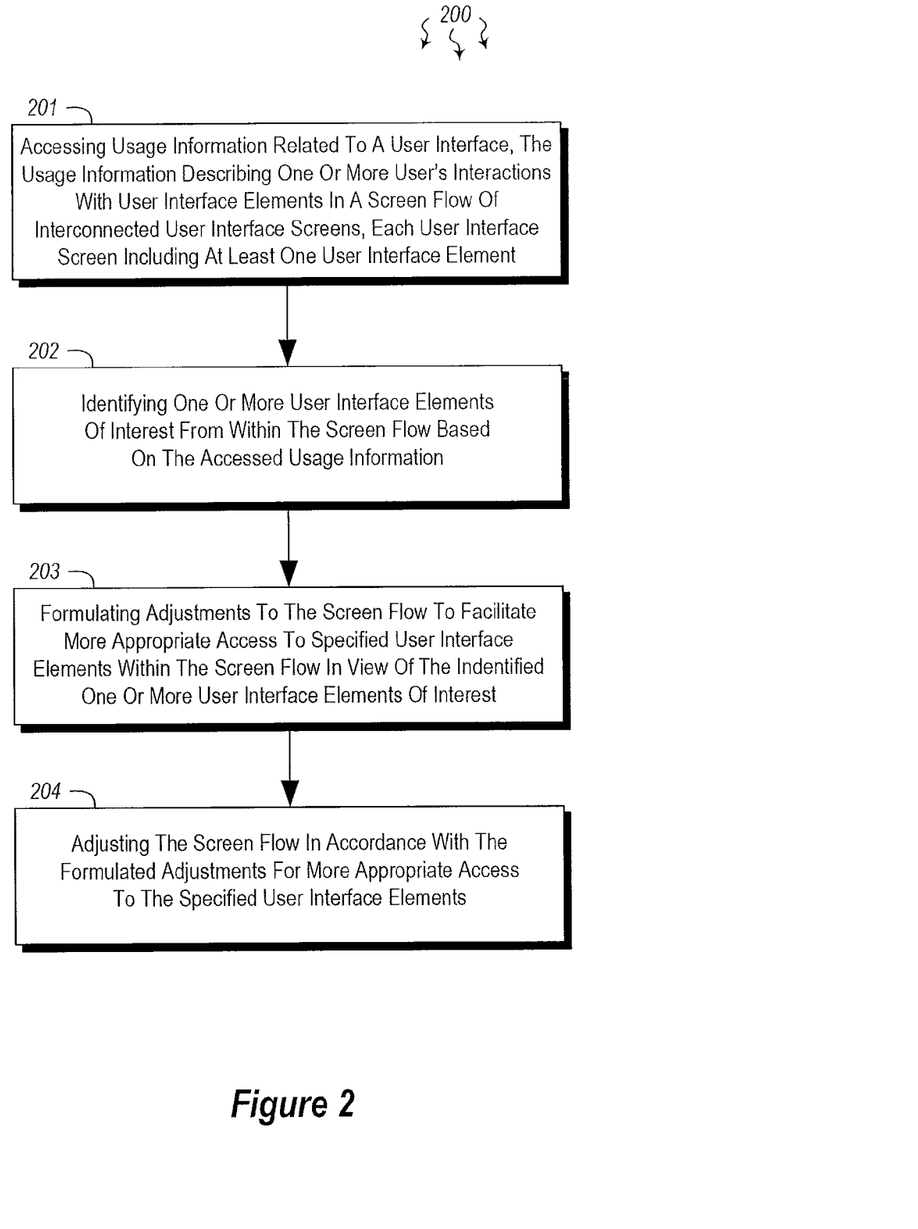
FIG. 2 illustrates a flow chart of an example method for adjusting a screen flow.

FIG. 2 illustrates a flow chart of an example method 200 for adjusting a screen flow. Method 200 will be described with respect to the components and data of computer architecture 100.

Method 200 includes an act of accessing usage information related to a user interface, the usage information describing interactions with user interface elements in a screen flow of interconnected user interface screens, each user interface screen including at least one user interface element (act 201). For example, UI adjustment module 101 can access UI usage information 111 and user interface data 112. User interface data 112 can define a screen flow of interconnected user interface screens (each including at least one user interface element, such as, for example, a menu item) for a user interface of application 102. UI usage information 111 can describe interactions with the screen flow of interconnected user interface screens.

Usage information 111 can include historical data as well as real-time data. Historical data can include user specific data for a device, user specific data for another device (or other devices), demographic data (age, sex, country), other social data, user interactions with a device, usage specific data for a device type, all user interactions for a device type, manufacturer presets and limitations, manufacturer historical data for one or more users.

As such, UI usage information 111 can describe one or more user interactions with user interface screens and menu options in user interface data 112. UI usage information 111 can include historical information collected during prior interaction with user interface screens and menu options. Alternately or in combination, UI information 111 can include feedback collected during a current interaction with user interface screens and menu options.

In some embodiments, UI usage information 111 describes the interactions of a single user (e.g., user 121). In other embodiments, UI usage information 111 describes the interactions of a plurality of users (e.g., user 121 as well as one or more users of other devices 106). For example, UI usage information 111 can include UI usage information 117 from other devices 106.

User interface data 112 can include any of a variety of different types of structural user interface elements and/or interaction user interface elements used to formulate user interface screens and menu options. Structural user interface elements can include windows, menus, icons, controls (widgets), and tabs. Interaction user interface elements can include cursors, pointers, adjustment handles (e.g., used for drag and drop), and selections.

Windows can include container windows, browser windows, text terminal windows, child windows, and dialog boxes. Menus can include context menus (e.g., revealed by pressing a right mouse button) and can have a menu bar and/or menu extras. Controls can include pointers, text boxes, buttons, hyperlinks, drop-down lists, list boxes, combo boxes, check boxes, radio buttons, cycle buttons, grids, and sliders.

Method 200 includes an act of identifying one or more user interface elements of interest from within the screen flow based on the accessed usage information (act 202). For example, UI adjustment module 101 can identify user interface elements (e.g. menu options) of interest from within the screen flow defined in user interface data 112. User interface elements can be identified based UI usage information 111.

Method 200 includes an act of formulating adjustments to the screen flow to facilitate more appropriate access to specified user interface elements within the screen flow in view of the identified one or more user interface elements of interest (act 203). For example, UI adjustment module 101 can formulate UI adjustments 113 to the screen flow defined in user interface data 112. UI adjustments 113 can facilitate more appropriate access to specified user interface elements in the screen flow. UI adjustments 113 can be made in view of the identified one or more user interface elements of interest. Formulating adjustments for screens flows can include: formulating adjustments to remove screens from a screen flow, rearrange screens of a screen, create new screens for a screen flow, remove graphical elements (e.g., menu options) from a screen, rearrange graphical elements (e.g., menu options) within a screen, add graphical elements (e.g., menu options) to a screen, move a graphical element (e.g., a menu option) between screens of a screen flow, etc.

In some embodiments, the specified user interface elements intersect with the one or more user interface elements of interest. For example, the specified user interface elements and the one or more user interface elements of interest can have at least one user interface element in common. In these embodiments, an adjustment to the screen flow can facilitate more appropriate access to a user interface element in view of the usage of the same user interface element.

In other embodiments, the specified user interface elements are different from the one or more user interface elements of interest. In these embodiments, an adjustment to the screen flow can facilitate more appropriate access to one user interface element in view of the usage of another user interface element. Method 200 includes an act of adjusting the screen flow in accordance with the formulated adjustments for more appropriate access to the specified user interface elements (act 204). For example, UI adjustment module 101 can integrate UI adjustments 113 into user interface data 112 to adjust the screen flow defined in user interface data 112 in accordance with UI adjustments 113. The adjustments to the screen flow can be for more appropriate access to the specified user interface elements.

More appropriate access can include presenting the specified user interface elements more predominately. For example, a menu item that is selected from a screen flow more frequently can be moved to a different UI screen closer to a start UI screen or to a more predominate position on an existing UI screen. Conversely and/or to compensate, a menu item that is selected less frequently can be moved to a different UI screen further from a start UI screen or to a less predominate position on an existing UI screen.

UI adjustment module 101 can send user interface data 112 to application 102. UI presentation module 103 can receive user interface data 112 from UI adjustment module 101. UI presentation module 103 can send UI screens/menu items 114 to display device 105 for presentation. Display device 105 can receive UI screens/menu items 114 and present a user interface screen flow based on UI screens/menu items 114 (and that reflects UI adjustments 113).

User 121 can interact with the user interface screen flow. As user 121 interacts with the user interface screen flow, usage tracking module 104 can collect UI usage information 116 for user 121. Usage tracking module 104 can provide UI usage information back for UI adjustment module 101 and/or integrate UI usage information 116 back into UI usage information 111. UI adjustment module 101 can then determine further screen flow adjustments taking UI usage information 116 into account.

In some embodiments, user interface screens and/or menu items are added to a screen flow based on a determination that a user has the ability to handle a more complex feature set.

In other embodiments, a user experience is tuned based on group usage information.

Figure 3:
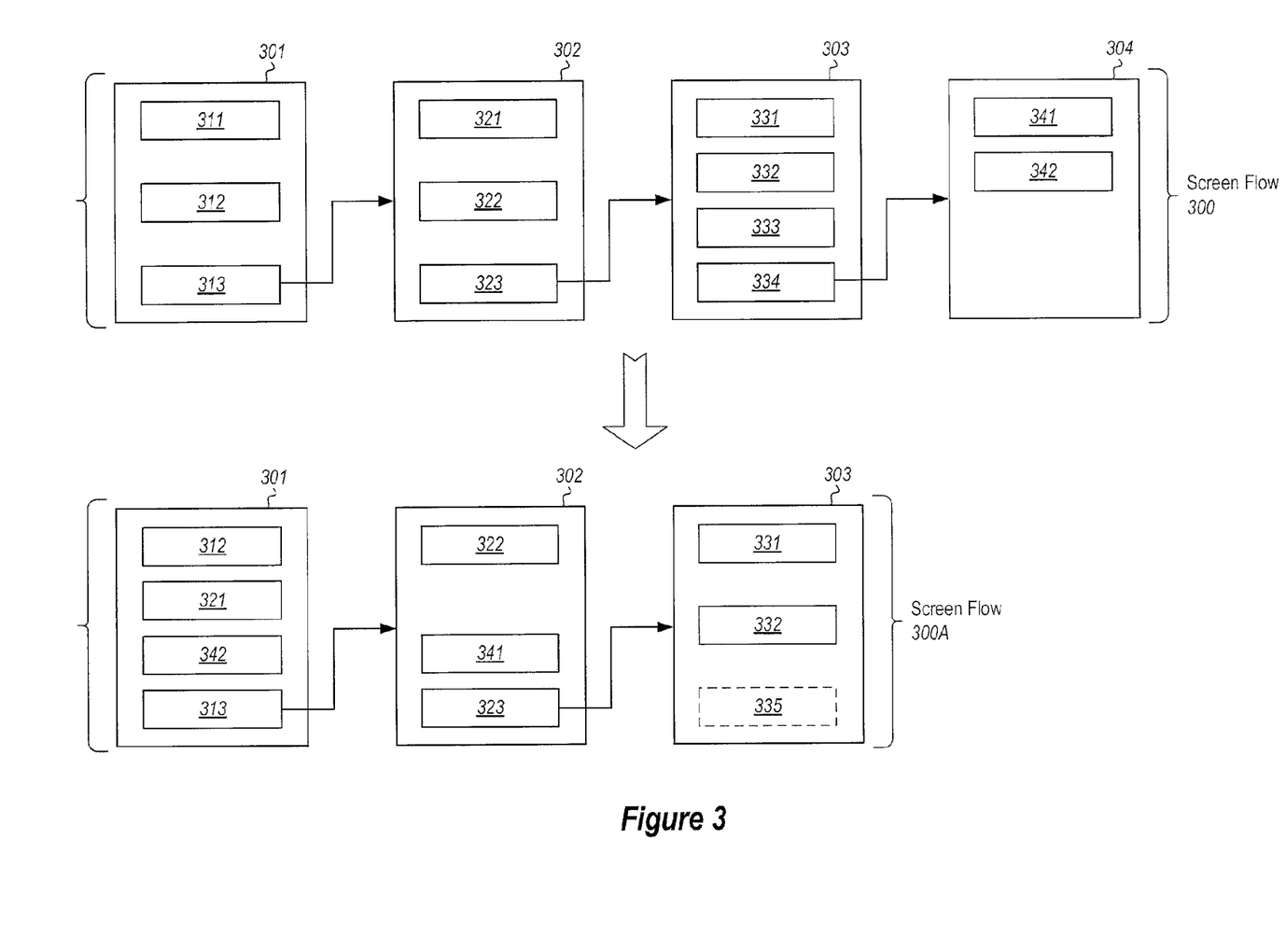
FIG. 3 illustrates an example of adjusting a screen flow.

Referring now to FIG. 3, FIG. 3 illustrates an example of adjusting a screen flow. As depicted, FIG. 3 includes screen flow 300 and screen flow 300A. Screen flow 300 includes user interface start screen 301 and user interface screens 302, 303, and 304. User interface start screen 301 includes menu items 311, 312, and 313. Selection of menu item 313 causes screen flow 300 to transition to user interface screen 302. User interface screen 302 includes menu items 321, 322, and 323. Selection of menu item 323 causes screen flow 300 to transition to user interface screen 303. User interface screen 303 includes menu items 331, 332, 333, and 334. Selection of menu item 334 causes screen flow 300 to transition to user interface screen 304. User interface screen 304 includes menu items 341 and 342. Each user interface screen may also have a "back" menu item (not shown) to cause screen flow 300 to transition towards user interface start screen 301.

Screen flow 300A includes user interface start screen 301 and user interface screens 302 and 303. User interface start screen 301 includes menu items 312, 321, 342 and 313. Selection of menu item 313 causes screen flow 300 to transition to user interface screen 302. User interface screen 302 includes menu items 322, 341, and 323. Selection of menu item 323 causes screen flow 300 to transition to user interface screen 303. User interface screen 303 includes menu items 331, 332, and 335. Each user interface screen may also have a "back" menu item (not shown) to cause screen flow 300 to transition towards user interface start screen 301.

Based on UI usage information for screen flow 300, adjustments can be formulated and integrated into user interface data to adjust screen flow 300 to screen flow 300A. As depicted, menu items 321 and 342 have been moved to user interface start screen 301. Menu items 321 and 342 can be moved to user interface start screen 301 to increase predominance, for example, as a result of increased usage. Menu items 311, 321, and 333 have been removed from user interface screens 301, 302, and 303 respectively. Menu items 311, 321, and 333 can be removed, for example, as a result of decreased usage.

Menu item 322 has been moved to the top of user interface screen 302. Menu items 323 and 342 can be moved to the top of user interface screen to increase predominance, for example, as a result of increased usage. Menu items 341 have been moved to user interface start screen 302. Menu item 341 can be moved to user interface screen 302 to increase predominance, for example, as a result of increased usage (but possible less usage than menu item 342). Menu item 335 is added to user interface screen 303. Menu item 335 can be added to user interface 303 based on the usage of other menu items in screen flow 300 and/pr screen flow 300A.

Figure 4:
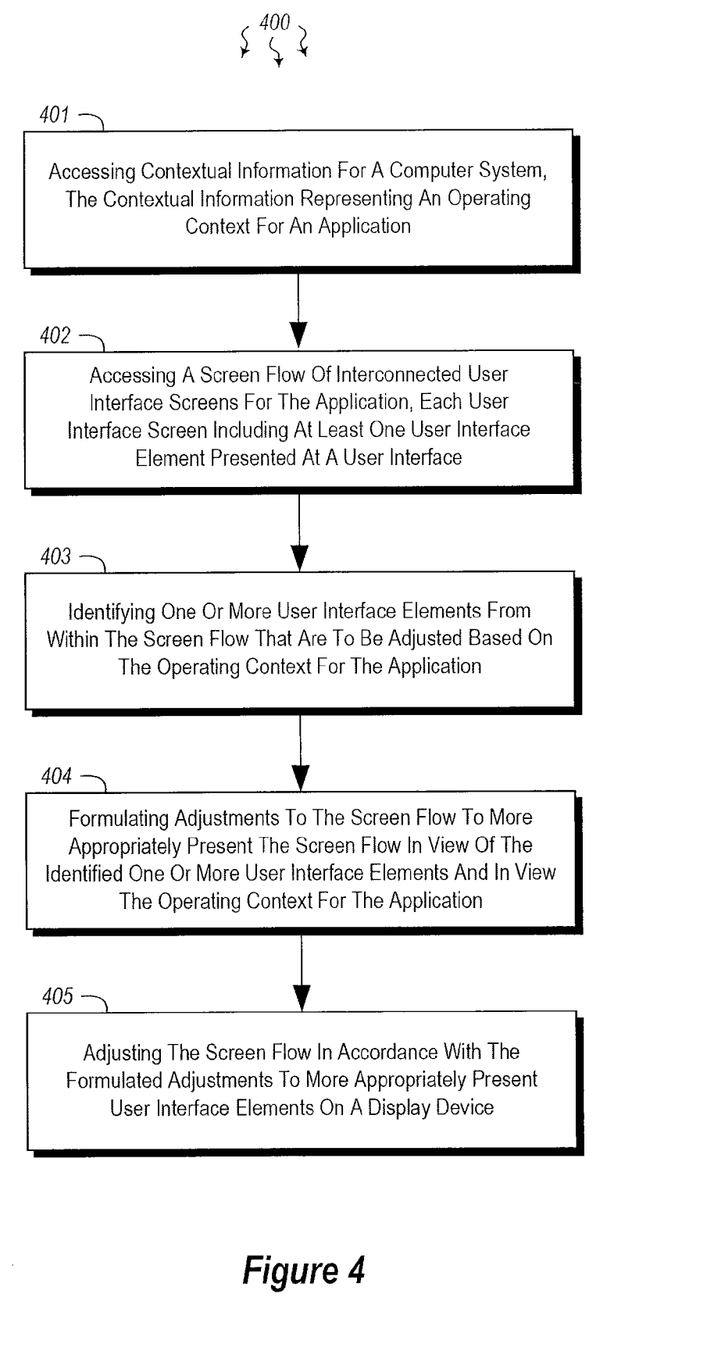
FIG. 4 illustrates a flow chart of an example method for adjusting a screen flow for an application.

In some embodiments, either alternately or in combination, contextual information is used when formulating screen flow adjustments. Contextual information can include device/manufacturer settings, user preferences, operating environment, weather, time, date, etc. FIG. 4 illustrates a flow chart of an example method 400 for adjusting a screen flow for an application. Method 400 will be described with respect to the components and data of computer architecture 100.

Method 400 includes an act of accessing contextual information for the computer system, the contextual information representing an operating context for an application (act 401). For example, UI adjustment module 101 can access contextual information 118. Contextual information 118 can define an operating context for application 102.

Method 400 includes an act of accessing a screen flow of interconnected user interface screens for the application, each user interface screen including at least one user interface element presented at a user interface (act 402). For example, UI adjustment module 101 can access user interface data 112. User interface data 112 can define a screen flow of interconnected user interface screens (each including at least one user interface element, such as, for example, a menu item) for a user interface of application 102.

Method 400 includes an act of identifying one or more user interface elements from within the screen flow that are to be adjusted based on the operating context for the application (act 403). For example, UI adjustment module 101 can identify user interface elements (e.g. menu options) from within the screen flow defined in user interface data 112 that are to be adjusted. The identified user interface elements can be identified based on an operating context defined in contextual information 118.

Method 400 includes an act of formulating adjustments to the screen flow to more appropriately present the screen flow in view of the identified one or more user interface elements and in view the operating context for the application (act 404). For example, UI adjustment module 101 can formulate UI adjustments 113 to the screen flow defined in user interface data 112. UI adjustments 113 can facilitate more appropriate access to specified user interface elements in the screen flow. UI adjustments 113 can be made in view of the identified one or more user interface elements and in view of contextual information 118. Formulating adjustments for screens flows can include formulating adjustments to remove screens, rearrange screens, create new screens, remove menu options, rearrange menu options, add menu options, etc.

Method 400 includes an act of adjusting the screen flow in accordance with the formulated adjustments to more appropriately present user interface elements on a display device (act 405). For example, UI adjustment module 101 can integrate UI adjustments 113 into user interface data 112 to adjust the screen flow defined in user interface data 112 in accordance with UI adjustments 113. The adjustments to the screen flow can be for more appropriate presentation of user interface elements at display device 105

In some embodiments, screen flow adjustments are managed in accordance with a policy. A policy can allow or prevent screen flow adjustments based on usage information. A limiting policy can be used to prevent some screen flow adjustments. For example, if a user has not paid for a specified service, a policy can prevent a menu item from being adding a UI screen or prevent a UI screen from being added to a screen flow, even if the menu item or UI screen would otherwise be added based on usage information. Policies can be implemented based on contextual information, such as, for example, contextual information 118.

Figure 5:
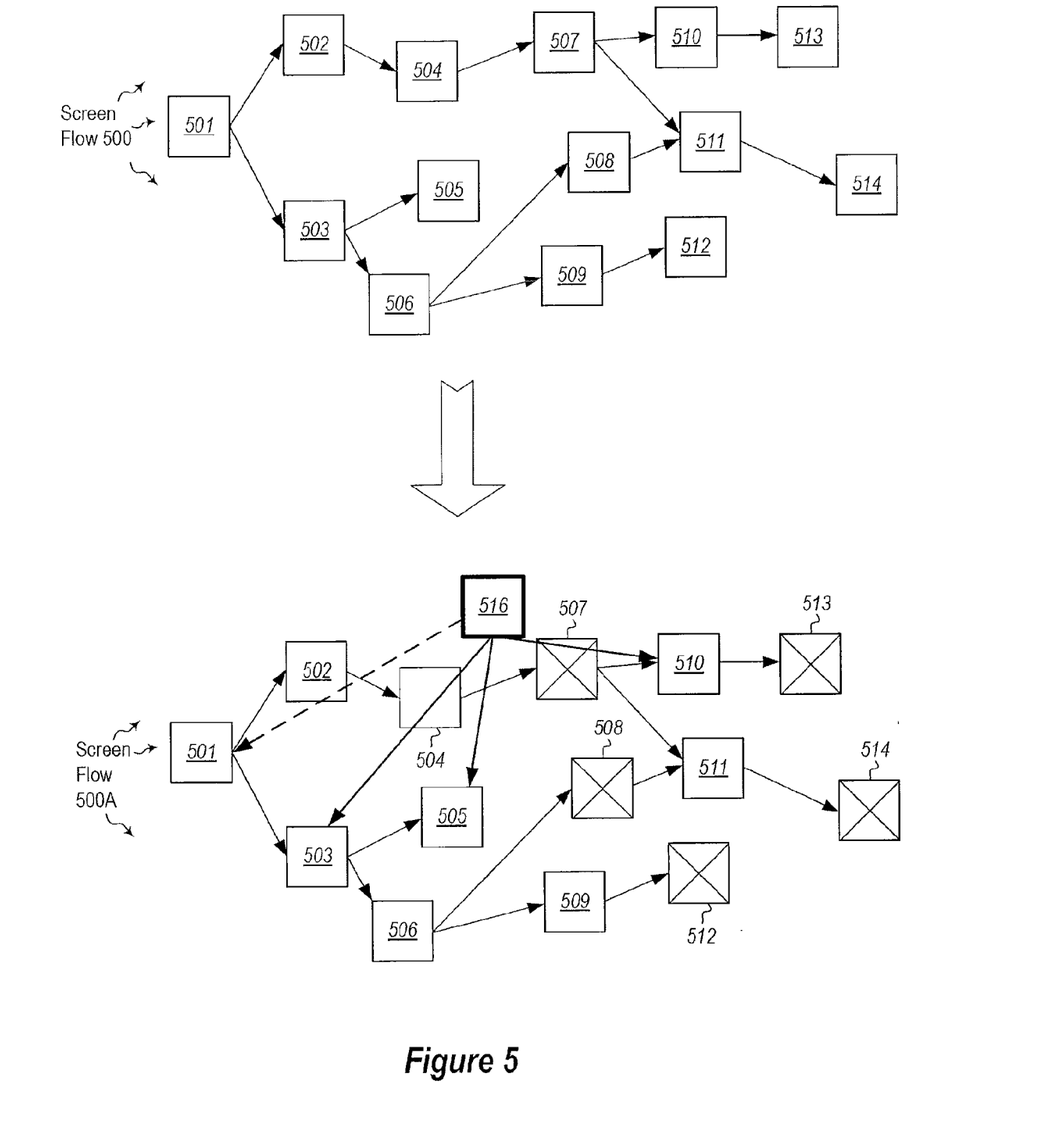
FIG. 5 illustrates an example of adjusting a screen flow.

FIG. 5 illustrates an example of adjusting a screen flow. As depicted, FIG. 5 includes screen flow 500 and screen flow 500A. Screen flow includes user interface starting screen 501 and user interface screens 502-514. The arrows between user interface screens represent the flow between user interface screens (e.g., screens on a mobile phone or automotive screens).

Based on UI usage information and/or contextual information for screen flow 500, adjustments can be formulated and integrated into user interface data to adjust screen flow 500 to screen flow 500A. As depicted in screen flow 500A, new user interface starting screen 516 is added. New user interface starting screen 516 can be created to permit more efficient access to commonly used user interface screens, such as, for example, user interface screens 503, 505, and 510. The dashed line indicates that new user interface starting screen 516 may or may not have a link to (previous) user interface starting screen 501. Depicted as crossed out, screens 507, 508, 512, 513, and 514 are removed (e.g., for lack of usage). Orphaned screens can be relinked or reordered for accessibility.

Figure 6:
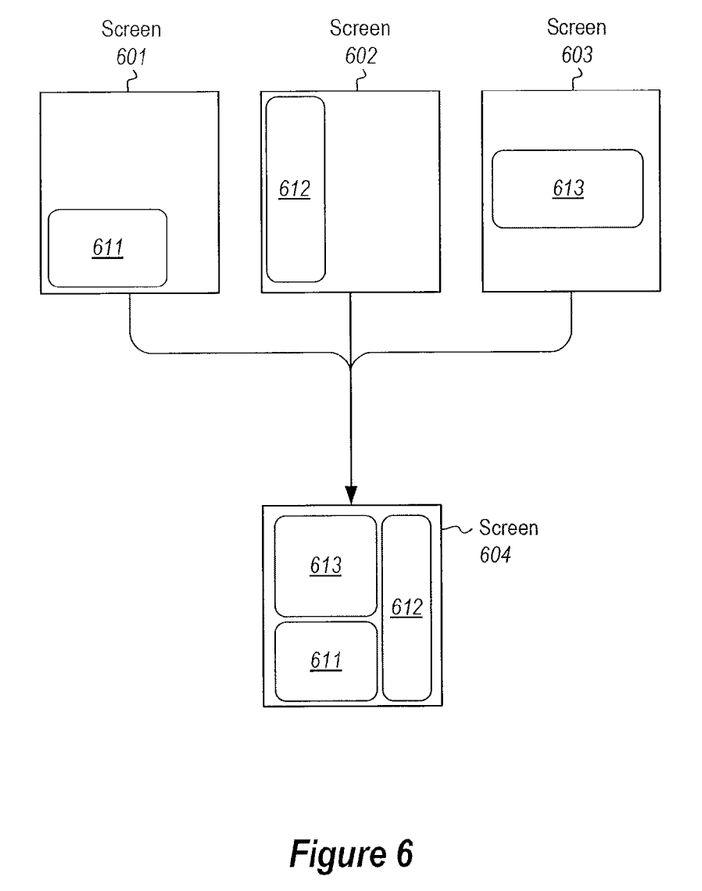
FIG. 6 illustrates an example of adjusting a screen flow.

FIG. 6 illustrates an example of adjusting a screen flow. As depicted, FIG. 6 includes screens 601, 602, and 603. UI usage information can indicate that user interface elements 611, 612, and 613 are frequently accessed. In response, screen 604 is created and user interface elements 611, 612, and 613 are moved into screen 604. User interface elements 611, 612, and 613 are also repositioned, resized, rearranged, etc. to facilitate a more optimal arrangement on screen 604. The arrangement in screen 604 can also be dynamic in that it changes in time as the user interacts with the device. This dynamism can change which screens are linked, which areas are duplicated, the size, shape, position, buttons, etc. of those areas among others.

Figure 7:
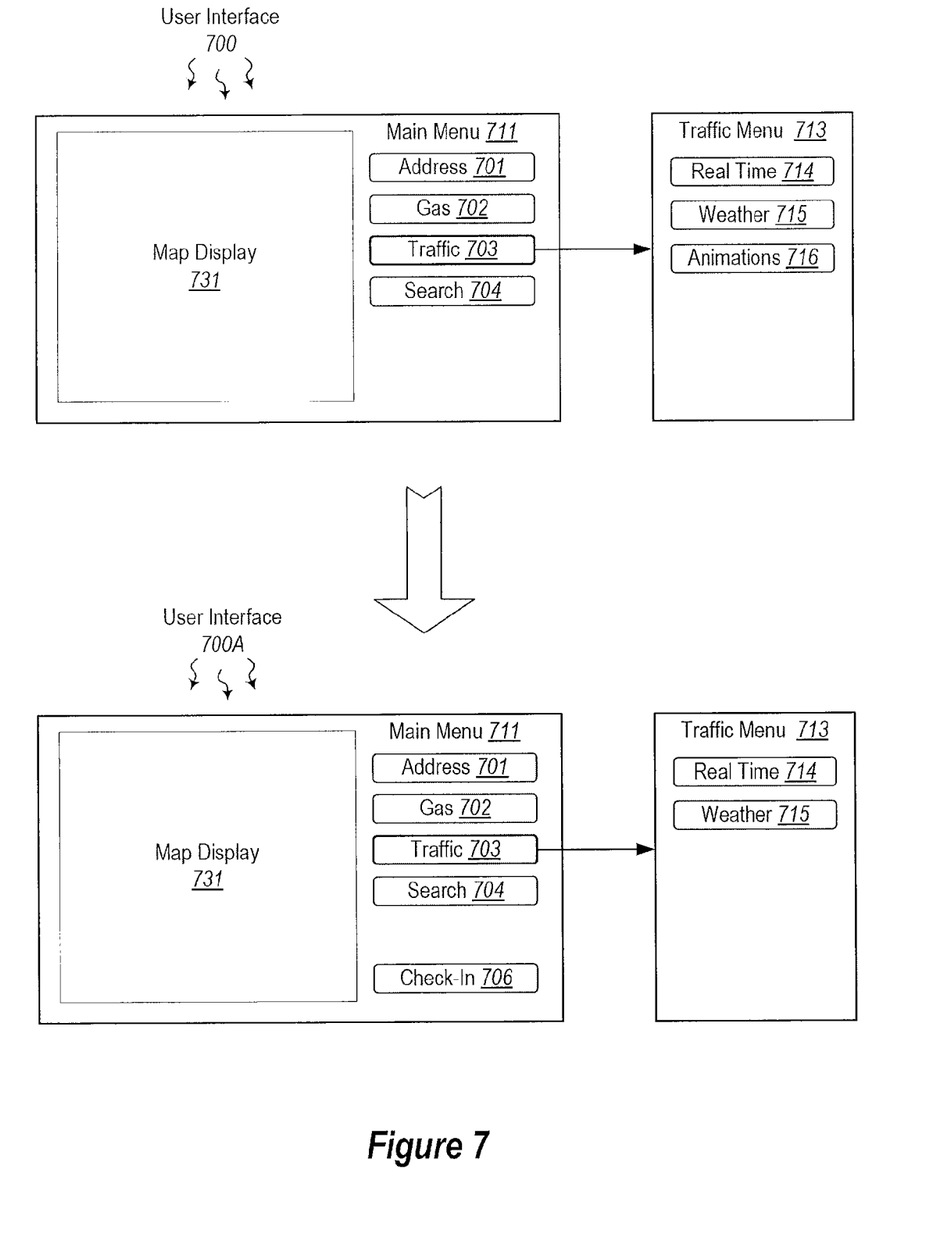
FIG. 7 illustrates an example of adjusting a screen flow.

FIG. 7 illustrates an example of adjusting a screen flow. As depicted, FIG. 7 includes screen flow 700 and screen flow 700A. Screen flow 700 can represent a navigation screen for an embedded system and a configuration menu for a traffic button. Screen flow 700 includes main menu 711 and traffic menu 713. Main menu includes address 701, gas 702, traffic 703, search 704 and map display 731. Traffic 703 can selected to access traffic menu 713. Traffic menu 713 includes real time 714, weather 715, and animations 716. Traffic menu 713 can allow a user to change the way traffic is displayed. Screen flow 700 can represent a default menu arrangement which is originally loaded.

Screen flow 700A includes main menu 711 and traffic menu 713. Main menu includes address 701, gas 702, traffic 703, search 704, check-in 706, and map display 731. Traffic 703 can selected to access traffic menu 713. Traffic menu 713 includes real time 714 and weather 715. Screen flow 700A can represent a menu arrangement after use of the system. It may be that a user never used animations 716 so the option was removed (e.g., to keep screen flow 700A simple). On the other hand, the user may have been using the system to search and input restaurants into the system. In response, the system adds a 'check-in' button 706 so the user can use more advanced navigation options, including posting to social networking services or check-in applications.

Accordingly, embodiments of the invention use historical data to augment, rearrange, or reconfigure menus and/or screen flows and add/remove/hide/expose content and functionality for users. Changing content and/or functionality can be done through the deletion or addition of items, pages, or menus as well if they are determined to not be of interest to the user or to that context. Commonly used or important UI elements can be pulled to other screens, such as for, example, a summary page or quick list page.

UI elements can be removed from a program or system. For example, areas of a user interface or system that are used sparingly can be removed. Removal can also include removal of code, data, and programs associated with those UI elements. For example, if a page has 5 concepts or UI element clusters on it and the historical data indicates the user only ever uses one of the five, then the system may take that 1 cluster and move it to another area or create a new area on a different screen for that cluster and then remove the page completely.

UI elements can also be added to a program or system based on historical data. Adding UI elements can be facilitated by using historical data to infer that the user is more advanced user in some aspect of the system. This may add more options to the user through UI elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a processor, system memory, and a display device, a method for adjusting a screen flow for an application, the method comprising:
   accessing a screen flow corresponding to a user interface of an application that is executing at the computer system, the screen flow including a plurality of interconnected user interface screens that each includes a subset of a plurality of user interface elements of the screen flow;
   in connection with a user's current interaction with the application at the computer system, accessing (i) usage information describing one or more user's historical interactions with the plurality of user interface elements, and (ii) contextual information describing an operating context for the application, the contextual information being selected from the group comprising a device setting, a manufacturer setting, a user preference, and an operating environment of the application;
   based on the usage information describing the one or more user's historical interactions with the plurality of user interface elements, identifying a first set of one or more of the plurality of user interface elements that are of interest to the user;
   based on the contextual information describing the operating context for the application, identifying a second set of one or more of the plurality of user interface elements that are to be adjusted based on the operating context for the application;
   formulating a plurality adjustments to the screen flow to facilitate more appropriate access to specified user interface elements within the screen flow in view of the identified first set of one or more user interface elements that are of interest to the user, and in view of the identified second set of one or more user interface elements that are to be adjusted based on the operating context for the application; and
   adjusting the screen flow in accordance with the formulated plurality of adjustments for more appropriate access to the specified user interface elements, including adjusting at least one user interface element from the first set of one or more user interface elements that are of interest to the user, and adjusting at least one user interface element from the second set of one or more user interface elements that are to be adjusted based on the operating context for the application.

2. The method as recited in claim 1, wherein accessing the usage information comprises accessing user feedback during use of the user interface.

3. The method as recited in claim 1, wherein the formulated adjustments are selected from the group comprising: (i) adding a user interface element to one of the interconnected user interface screens, (ii) removing a user interface element from one of the interconnected user interface screens, (iii) rearranging user interface elements within one of the interconnected user interface screens, (iv) moving one of the plurality of user interface elements from one interconnected user interface screen to another interconnected user interface screen, (v) removing one of the interconnected user interface screens from the screen flow, (vi) connecting a new user interface screen to the interconnected user interface screens of the screen flow and (vii) rearranging the interconnected user interface screens of the screen flow.

4. The method as recited in claim 1, wherein adjusting the screen flow in accordance with the formulated adjustments comprises connecting a new user interface screen to the interconnected user interface screens of the screen flow.

5. The method as recited in claim 4, wherein connecting a new user interface screen to the interconnected user interface screens of the screen flow comprises connecting a new user interface screen that includes user interface elements from one or more other of the interconnected user interface screens.

6. The method as recited in claim 1, wherein adjusting the screen flow in accordance with the formulated adjustments for more appropriate access to the specified user interface elements comprises adding a user interface element to one of the interconnected user interface screens.

7. The method as recited in claim 1, wherein adjusting the screen flow in accordance with the formulated adjustments for more appropriate access to the specified user interface elements comprises removing a user interface element from one of the interconnected user interface screens.

8. The method as recited in claim 1, wherein adjusting the screen flow in accordance with the formulated adjustments for more appropriate access to the specified user interface elements comprises removing a user interface screen from the interconnected user interface screens of the screen flow.

9. The method as recited in claim 1, wherein adjusting the screen flow in accordance with the formulated adjustments for more appropriate access to the specified user interface elements comprises rearranging the interconnected user interface screens of the screen flow.

10. The method as recited in claim 1, further comprising:
    determining that the user has an expected ability to handle a more complex feature set within the user interface than other users based on the accessed usage information; and
    wherein adjusting the screen flow in accordance with the formulated plurality of adjustments comprises adding the more complex feature set to the user interface by adding one or more user interface elements representing the more complex feature set to at least one of the interconnected user interface screens.

11. The method as recited in claim 1, wherein:
    accessing usage information comprises accessing group usage information related to the user interface, the group usage information describing how a group of users historically interacted with the plurality of user interface elements of the screen flow; and
    wherein adjusting the screen flow in accordance with the formulated plurality of adjustments comprises tuning a user experience provided by the screen flow based on the group usage information.

12. The method as recited in claim 1, wherein the first set of one or more user interface elements that are of interest to the user and the second set of one Or more user interface elements that are to be adjusted based on the operating context for the application share at least one particular user interface element in common, and wherein adjusting the screen flow in accordance with the formulated plurality of adjustments for more appropriate access to the specified user interface elements includes adjusting the at least one particular user interface element based on it being shared by the first set of one or more user interface elements and the second set of one or more user interface elements.

13. A computer system, comprising:
one or more processors; and
one or more hardware storage devices having stored thereon computer-executable instructions that, when executed by the one or more hardware processors, cause the computer system to execute a user interface adjustment module, the user interface adjustment module being configured to perform at least the following:
access a screen flow corresponding to a user interface of an application that is executing at the computer system, the screen flow including a plurality of interconnected user interface screens that each includes a subset of a plurality of user interface elements of the screen flow;
in connection with a user's current interaction with the application at the computer system, access (i) usage information describing one or more user's historical interactions with the plurality of user interface elements, and (ii) contextual information describing an operating context for the application, the contextual information being selected from the group comprising a device setting, a manufacturer setting, a user preference, and an operating environment of the application;
based on the usage information describing the one or more user's historical interactions with the plurality of user interface elements, identify a first set of one or more of the plurality of user interface elements that are of interest to the user;
based on the contextual information describing the operating context for the application, identify a second set of one or more of the plurality of user interface elements that are to be adjusted based on the operating context for the application;
formulate a plurality of adjustments to the screen flow to more appropriately present the screen flow in view of the identified first set of one or more user interface elements that are of interest to the user, and in view of the identified second set of one or more user interface elements that are to be adjusted based on the operating context for the application; and
adjust the screen flow in accordance with the formulated plurality of adjustments to more appropriately present user interface elements on a display device, including adjusting at least one user interface element from the first set of one or more user interface elements that are of interest to the user, and adjusting at least one user interface element from the second set of one or more user interface elements that are to be adjusted based on the operating context for the application.

14. The computer system as recited in claim 13, wherein the user interface adjustment module is also configured to access a policy that prevents one or more of the specified adjustments to the screen flow based on automatic learning of user capabilities.

15. The computer system as recited in claim 13, wherein the first set of one or more user interface elements that are of interest to the user and the second set of one or more user interface elements that are to be adjusted based on the operating context for the application share at least one particular user interface element in common, and wherein adjusting the screen flow in accordance with the formulated plurality of adjustments for more appropriate access to the specified user interface elements includes adjusting the at least one particular user interface element based on it being shared by the first set of one or more user interface elements and the second set of one or more user interface elements.

16. The computer system as recited in claim 13, wherein the user interface adjustment module is also configured to determine that the user has an expected ability to handle a more complex feature set within the user interface than other users based on the accessed usage information, and wherein adjusting the screen flow in accordance with the plurality of formulated adjustments comprises adding the more complex feature set to the user interface by adding a user interface element representing the more complex feature set to at least one of the interconnected user interface screens.

17. A computer program product for use at a computer system, the computer system a display device, the computer program product comprising one or more hardware storage devices having stored thereon computer-executable instructions that, when executed at a processor, cause the computer system to adjust a screen flow for an application, including at least the following:
accessing a screen flow corresponding to a user interface of an application that is executing at the computer system, the screen flow including a plurality of interconnected user interface screens that each includes a subset of a plurality of user interface elements of the screen flow;
in connection with a user's current interaction with the application at the computer system, accessing (i) usage information describing one or more user's historical interactions with the plurality of user interface elements, and (ii) contextual information describing an operating context for the application, the contextual information being selected from the group comprising a device setting, a manufacturer setting, a user preference, and an operating environment of the application:
based on the usage information describing the one or more user's historical interactions with the plurality of user interface elements, identifying a first set of one or more of the plurality of user interface elements that are of interest to the user;
based on the contextual information describing the operating context for the application, identifying a second set of one or more of the plurality of user interface elements that are to be adjusted based on the operating context for the application;
formulating a plurality of adjustments to the screen flow to facilitate more appropriate access to specified user interface elements within the screen flow in view of the identified first set of one or more user interface elements that are of interest to the user, and in view of the identified second set of one or more user interface elements that are to be adjusted based on the operating context for the application; and
adjusting the screen flow in accordance with the formulated plurality of adjustments for more appropriate access to the specified user interface elements, including adjusting at least one user interface element from the first set of one or more user interface elements that are of interest to the user, and adjusting at least one user interface element from the second set of one or more user interface elements that are to be adjusted based on the operating context for the application.

18. The computer program product as recited in claim 17, also including:
- determining that the user has an expected ability to handle a more complex feature set within the user interface than other users based on the accessed usage information; and
- wherein adjusting the screen flow in accordance with the plurality of formulated adjustments comprises adding the more complex feature set to the user interface by adding a user interface element representing the more complex feature set to at least one of the interconnected user interface screens.

19. The computer program product as recited in claim 17, wherein:
- accessing usage information comprises accessing group usage information related to the user interface, the group usage information describing how a group of users historically interacted with plurality of user interface elements of the screen flow; and
- wherein adjusting the screen flow in accordance with the plurality of formulated adjustments comprises tuning a user experience provided by the screen flow based on the group usage information.

20. The computer program product as recited in claim 17, wherein the first set of one or more user interface elements that are of interest to the user and the second set of one or more user interface elements that are to be adjusted based on the operating context for the application share at least one particular user interface element in common, and wherein adjusting the screen flow in accordance with the formulated plurality of adjustments for more appropriate access to the specified user interface elements includes adjusting the at least one particular user interface element based on it being shared by the first set of one or more user interface elements and the second set of one or more user interface elements.

* * * * *